Patented July 7, 1931

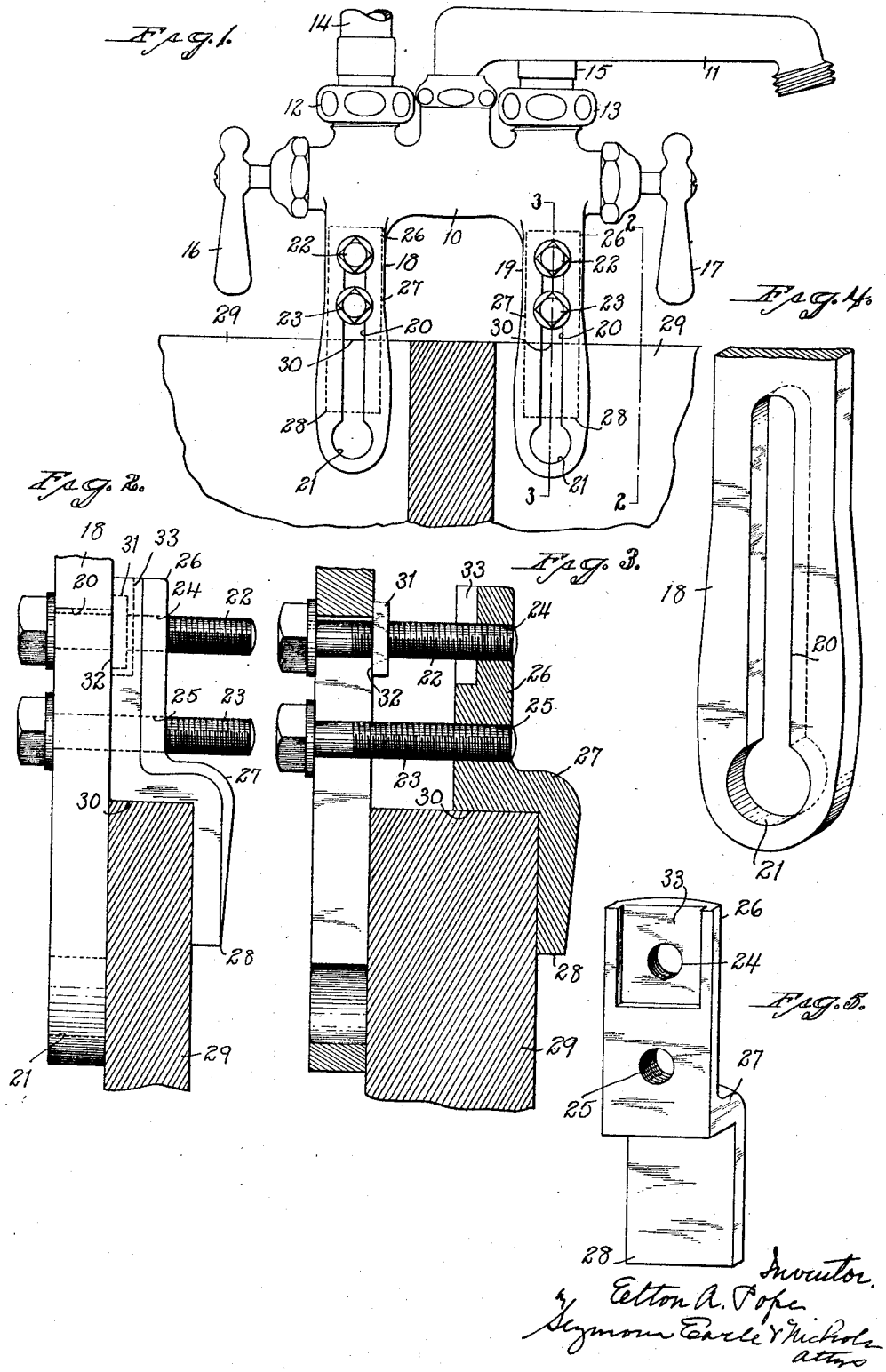

1,813,422

UNITED STATES PATENT OFFICE

ELTON A. POPE, OF OAKVILLE, CONNECTICUT, ASSIGNOR TO THE CHASE COMPANIES, INC., OF WATERBURY, CONNECTICUT, A CORPORATION

LAUNDRY TRAY FAUCET

Application filed September 20, 1930. Serial No. 483,292.

This invention relates to an improvement in laundry-tray faucets and particularly to the feature thereof designed for securing the same in place upon a laundry tray or tub.

The main object of this invention is to provide a laundry-tray faucet having simple, reliable and superior means for mounting it in various positions of adjustment upon laundry trays or tubs, and constructed with particular reference to capacity for securely clamping it to tray or tub walls of a wide range of thicknesses.

With the above and other objects in view as will appear from the following, my invention consists in a laundry-tray faucet having certain details of construction and combinations of parts as will be hereinafter described and particularly recited in the claims.

In the accompanying drawings:

Fig. 1 is a view in front elevation of a laundry-tray faucet embodying my invention and shown as mounted upon the rear wall of a laundry tray, which is broken away and shown partly in section;

Fig. 2 is a broken view in vertical section taken on the line 2—2 of Fig. 1, but on a larger scale;

Fig. 3 is a vertical sectional view on the line 3—3 of Fig. 1, but showing the positioning of the parts when the faucet structure is mounted upon a laundry tray or tub having a thicker wall than that shown in Fig. 2;

Fig. 4 is a detached broken perspective view of one of the supporting legs of the faucet structure; and Fig. 5 is a detached perspective view of one of the clamp members.

In the embodiment of my invention herein chosen for illustration, I employ a laundry-tray faucet consisting of a body-portion 10 which may be of any approved construction and, as shown, is provided with a swinging nozzle 11, and hot- and cold-inlet water-connections 12 and 13 respectively coupled to hot- and cold-water feed-pipes 14 and 15. The flow of hot and cold water is controlled by valve-mechanisms housed within the body 10 and operated respectively by lever-handles 16 and 17, in any of the well-known manners of faucet structures.

The body-member 10 is provided with a pair of complementary depending mounting-legs 18 and 19, preferably formed integral with the said body-member. Since these supporting-legs correspond, the description of one will serve for both and features of each, together with the parts associated therewith, bear like reference characters in the accompanying drawings.

Each mounting-leg is formed with a vertical slot 20 enlarged at its lower end as at 21, to form what is commonly known as a "keyhole slot," for the reception of a pair of complementary bolts 22 and 23, the threaded ends of which are respectively adapted to enter threaded bores 24 and 25 in the upper arm 26 of a Z-shaped clamp member 27, one of which latter is provided for each mounting-leg.

The lower end or gripping-arm 28 of each clamp member is adapted to engage one face of a tray- or tub-wall 29, the opposite face of which is engaged by the opposed face of the complementary mounting-leg. Each clamp 27 is also formed with a horizontal stop-shoulder 30 adapted to engage the upper edge of the tray-wall for positively preventing the downward displacement of the faucet fixture, once the same has beeen clamped in place upon the tray or tub.

The lower bolt 23 acts to pull the clamp member 27 bodily toward the particular mounting-leg with which it is associated so as to compress the tray-wall 29 and at the same time to tend to compress the upper bolt 22. To prevent the upper bolt 22 from yielding under the draft of the lower bolt 23, I provide the same with an annular thrust-collar 31, preferably though not necessarily formed integral therewith and providing a thrust-shoulder 32 for engagement with the face of the mounting-leg opposed to the clamping member 27, as clearly shown in Fig. 3 of the drawings.

In order to permit the close approach of the clamp member 27 to its complementary mounting-leg, the upper arm 26 thereof has its inner face formed with a clearance-notch 33 for the clearance of the thrust-collar 31, as shown in Fig. 2.

In installing my improved laundry-tray faucet upon a laundry tray or tub, the same is positioned so that its mounting-legs 18 and 19 are located against one face of the wall 29 of the tub and the respective clamp members 27 are located against the opposite face thereof with their respective stop-shoulders 30 resting upon the upper edge of the said wall.

The faucet fixture proper is now adjusted vertically to the desired position, which adjustment is permitted by the fact that the bolts 22 and 23 extend through the vertical slot 20 in the respective legs 18 and 19 and may ride relatively up and down thereon. When the faucet fixture has been positioned as desired, the respective lower bolts 23 are tightened to draw the clamp members 27 toward their complementary supporting-legs and the bolt 22 is adjusted to maintain the upper arm 26 of the said clamp members in parallelism with the leg or at any required slight angle with respect thereto, as may be required by the angular difference between the opposite faces of the tub-wall 29.

From the foregoing, it will be seen that since the lower end of each of the clamp members 27 comprising its gripping-arm 28 is engaged with the tub-wall 29, there will be a tendency for the clamp as a whole, to rock upon the bolt 23 under the draft or pull of the latter, which tends to swing the upper end of the upper arm 26 of the said clamp inward toward its complementary mounting-leg. This latter tendency is checked by the fact that the bolt 22 is provided with a thrust-shoulder 32, the space between which and the clamp member may be adjusted as required by the threading of the outer end of the said bolt into or out of the threaded bore 24 in the clamp member, as may be required to bring the gripping-arm 28 of the particular clamp member to a full bearing against the face of the tray-wall. Thus, the bolts 22 act as "adjustable compression members" while the bolts 23 complement the same and act as "adjustable draft members," the manipulation of both of which will serve to bring the inner face of the gripping-arms 28 of the clamp members 27 into parallelism with the wall 29 of the tray or tub.

While I have shown and described the clamp members as located to the rear of their respective mounting-legs, it is obvious without further illustration that the said clamp members may be reversely located so as to engage the front face of the wall of the tray, while the mounting-legs bear against the rear face of the tray-wall.

My invention thus provides for mounting the laundry-tray faucet securely and conveniently upon tray-or tub-walls of varying thicknesses, and by providing a slot in each of the mounting-legs 18 and 19, the faucet fixture may be adjusted vertically as desired.

It will be understood by those skilled in the art that my invention may assume varied physical forms without departing from my inventive concept and I, therefore, do not limit myself to the specific embodiment herein chosen for illustration, but only as indicated in the appended claims.

I claim:

1. In a faucet fixture, the combination with a mounting member therefor; of a clamp member complementing the said mounting member to grip a tray-wall therebetween; an adjustable draft member adjustably connecting the said clamp member from a point between its ends to the said mounting member for pulling the former toward the latter; and an adjustable compression member for adjustably resisting the pull of the said draft member and located at a point, with respect to the latter, opposite the point at which the said mounting and clamp members grip the tray-wall.

2. In a faucet fixture, the combination with a mounting member therefor; of a clamp member complementing the said mounting member to grip a tray-wall therebetween; one of the said members being formed with a vertical slot; an adjustable draft member extending through the said slot for adjustment therein and adjustably connecting the said clamp member from a point between its ends to the said mounting member for pulling the former toward the latter; and an adjustable compression member for adjustably resisting the pull of the said draft member and extending through the said slot at a point, with respect to the said draft member, opposite the point at which the said mounting and clamp members grip the tray-wall.

3. In a faucet fixture, the combination with a mounting member therefor; of a clamp member complementing the said mounting member to grip a tray-wall therebetween and provided with a stop-shoulder for engaging the edge of the latter; one of the said members being formed with a vertical slot; an adjustable draft member extending through the said slot for adjustment therein and adjustably connecting the said clamp member from a point between its ends to the said mounting member for pulling the former toward the latter; and an adjustable compression member for adjustably resisting the pull of the said draft member and extending through the said slot at a point, with respect to the said draft member, opposite the point at which the said mounting and clamp members grip the tray-wall.

4. In a faucet fixture, the combination with a mounting member therefor; of a clamp member complementing the said mounting member to grip a tray-wall therebetween; an adjustable draft-screw connecting the said clamp member from a point between its ends to the said mounting member for pulling the former toward the latter; and an adjustable compression-screw for adjustably resisting the pull of the said draft-screw and located at a point, with respect to the latter, opposite the point at which the said mounting and clamp members grip the tray-wall.

5. In a faucet fixture, the combination with a mounting member therefor; of a clamp member complementing the said mounting member to grip a tray-wall therebetween; one of the said members being formed with a vertical slot; an adjustable draft-screw connecting the said clamp member from a point between its ends to the said mounting member for pulling the former toward the latter; and an adjustable compression-screw for adjustably resisting the pull of the said draft-screw and located at a point, with respect to the latter, opposite the point at which the said mounting and clamp members grip the tray-wall.

6. In a faucet fixture, the combination with a mounting member therefor formed with a vertical slot; of a clamp member complementing the said mounting member to grip a tray-wall therebetween; an adjustable draft-screw connecting the said clamp member from a point between its ends to the said mounting member and extending through the vertical slot in the later; and an adjustable compression-screw formed with a stop-shoulder engaging the face of the said supporting member facing toward the said clamp member and threaded into the said clamp member at a point on the opposite side of the said draft-screw from the point at which the said mounting and clamp members grip the tray-wall.

7. In a faucet fixture, the combination with a mounting member therefor formed with a vertical keyhole slot; of a clamp member complementing the said mounting member to grip a tray-wall therebetween; an adjustable draft-screw connecting the said clamp member from a point between its ends to the said mounting member and extending through the keyhole slot in the latter; and an adjustable compression-screw formed with an integral stop-shoulder engaging the face of the said supporting member facing toward the said clamp member and threaded into the said clamp member at a point on the opposite side of the said draft-screw from the point at which the said mounting and clamp members grip the tray-wall.

In testimony whereof, I have signed this specification.

ELTON A. POPE.